US010279499B2

(12) United States Patent
Coursey et al.

(10) Patent No.: US 10,279,499 B2

(45) **Date of Patent: *May 7, 2019**

(54) LIFTING DEVICE FOR STRIPPING AND BLANKING OPERATIONS

(71) Applicant: Atlas Die, LLC, Elkhart, IN (US)

(72) Inventors: David J. Coursey, Conyers, GA (US); Brightman Kenneth Holliday, Conyers, GA (US)

(73) Assignee: Atlas Die, LLC, Elkhart, IN (US)

( * ) Notice: Subject to any disclaimer, the term of this patent is extended or adjusted under 35 U.S.C. 154(b) by 163 days.

This patent is subject to a terminal disclaimer.

(21) Appl. No.: 15/351,593

(22) Filed: Nov. 15, 2016

(65) Prior Publication Data

US 2017/0072580 A1 Mar. 16, 2017

Related U.S. Application Data

(63) Continuation of application No. 13/451,201, filed on Apr. 19, 2012, now Pat. No. 9,492,938, which is a continuation of application No. 13/155,550, filed on Jun. 8, 2011, now Pat. No. 8,266,993, which is a (Continued)

(51) Int. Cl.

| | |
|---|---|
| ***B62D 7/06*** | (2006.01) |
| ***B26D 7/00*** | (2006.01) |
| ***B26D 7/01*** | (2006.01) |
| ***B26D 7/18*** | (2006.01) |

(Continued)

(52) U.S. Cl.

CPC ............... *B26D 7/015* (2013.01); *B26D 7/00* (2013.01); *B26D 7/01* (2013.01); *B26D 7/18* (2013.01); *B26F 1/00* (2013.01); *B65H 9/00* (2013.01); *B65H 2404/563* (2013.01); *Y10T 83/04* (2015.04); *Y10T 83/0405* (2015.04); *Y10T 83/2092* (2015.04); *Y10T 83/2096* (2015.04)

(58) Field of Classification Search

CPC . B26D 7/00; B26D 7/01; B26D 7/015; B26D 7/18; B26F 1/00; B65H 2404/563; B65H 9/00; Y10T 83/04; Y10T 83/0405; Y10T 83/2092; Y10T 83/2096

See application file for complete search history.

(56) References Cited

U.S. PATENT DOCUMENTS

| | | | |
|---|---|---|---|
| 3,111,874 | A | 11/1963 | Grover et al. |
| 3,518,922 | A | 7/1970 | Kuehn |
| 3,946,627 | A | 3/1976 | Hofmann |

(Continued)

*Primary Examiner* — Stephen Choi

(74) *Attorney, Agent, or Firm* — Kilyk & Bowersox, P.L.L.C.

(57) ABSTRACT

A deflectable lifting device can be mounted to a support form, work surface or other member of a material conveyance system. According to embodiments, the deflectable lifting device can have a base that mounts into the support, and a bendable arm arranged in the pathway of a material conveyance system, such as a paper stripping or paper blanking work station. When a sheet or web of material travels over the deflectable lifting device, the bendable arm can bend and deflect downwards, but still contact the sheet or web with a gently humped or arcuate portion, providing a small margin of elevation or lift to the sheet or web. The sheet or web can therefore be elevated above edges, holes, or other obstructions in the pathway that could jam or snag the delivery of the material.

11 Claims, 13 Drawing Sheets

Related U.S. Application Data continuation of application No. 11/901,096, filed on Sep. 14, 2007, now Pat. No. 8,061,247.

(60) Provisional application No. 60/927,267, filed on May 2, 2007, provisional application No. 60/845,086, filed on Sep. 15, 2006.

(51) Int. Cl.
*B26F 1/00* (2006.01)
*B65H 9/00* (2006.01)

(56) References Cited

U.S. PATENT DOCUMENTS

| | | | | |
|---|---|---|---|---|
| 4,303,217 | A | | 12/1981 | Garfinkle |
| 4,615,448 | A | | 10/1986 | Johnstonbaugh |
| D297,666 | S | | 9/1988 | Colombo |
| 5,106,050 | A | | 4/1992 | Vaccaro et al. |
| 5,138,803 | A | | 8/1992 | Grossen |
| 5,194,064 | A | | 3/1993 | Simpson et al. |
| 5,337,639 | A | | 8/1994 | Morrison |
| D422,198 | S | | 4/2000 | Snell |
| 6,071,225 | A | * | 6/2000 | Kucharski ............... B31B 50/00 493/396 |
| 6,644,153 | B1 | | 11/2003 | Gordon |
| 6,659,927 | B2 | | 12/2003 | Myers et al. |
| 6,692,425 | B2 | | 2/2004 | Myers et al. |
| 6,779,426 | B1 | | 8/2004 | Holliday |
| 6,792,840 | B2 | | 9/2004 | Myers et al. |
| 6,966,245 | B1 | | 11/2005 | Simpson |
| D550,451 | S | | 9/2007 | Burlington |
| 7,360,475 | B2 | | 4/2008 | Quercia |
| 2002/0160899 | A1 | | 10/2002 | Myers et al. |
| 2010/0037741 | A1 | | 2/2010 | Luquette |

* cited by examiner

LIFTING DEVICE FOR STRIPPING AND BLANKING OPERATIONS

CROSS-REFERENCE TO RELATED APPLICATIONS

This is a continuation application of U.S. patent application Ser. No. 13/451,201, filed Apr. 19, 2012, now U.S. Pat. No. 9,492,938 B2, which is a continuation of U.S. patent application Ser. No. 13/155,550, filed Jun. 8, 2011, now U.S. Pat. No. 8,266,993 B2, which is a continuation of U.S. patent application Ser. No. 11/901,096, filed Sep. 14, 2007, now U.S. Pat. No. 8,061,247 B2, issued Nov. 22, 2011, which in turn claims benefit of U.S. Provisional Patent Applications Nos. 60/927,267, filed May 2, 2007, and 60/845,086, filed Sep. 15, 2006, all of which are incorporated herein in their entireties by reference.

FIELD OF THE INVENTION

The present teachings relate to the field of paper or other fiber product manufacturing, and more particularly to a device and method for preventing jamming or snagging of paper, cardboard, or other sheets or webs of conveyed material as they are transferred across presses, dies, punches, or other paper-cutting or paper-forming equipment.

BACKGROUND OF THE INVENTION

Packaging, stationary, and other paper-based products are generally manufactured using sheets of raw paper stock or other material that are drawn across presses, dies, punches, or other paper-cutting or paper-forming equipment. Beverage and other cartons, containers, playing cards, signs, placards, corrugated boxes, and other paper or fiber-based or other products are generally formed by contacting a sheet or web of raw material with a punch or die when stripping-out desired areas of material. Such products can also be formed by contacting the sheet or web with a cutting or fold-making blade when generating blanks out of the sheet.

The first process of stripping out holes or sections from the larger piece of material, which leaves a shaped hole and a desired perimeter or outline in the intact paper or other material, is generally referred to as stripping. The second process of cutting or punching a desired shape or section of the sheet entirely out of the sheet and dropping away the removed portion as the desired product, is generally referred to as blanking. In both stripping and blanking operations, the raw feedstock can be in the form of paper, cardboard, plastic, fibrous, or other material, which is conveyed over a working area. The working area can generally include a flat cutting surface or hollow female blanking area over which a blank stock can be contacted with a blade, punch, or other working tool. The sheets are conveyed through work areas on support frames, for example, wooden, metal, or other support frames, which can be sized to conform to the input sheets. The sheets can be conveyed across the stripping or blanking areas using belt drives, linear motors, or other sources of mechanical driving force.

Known stripping and blanking configurations suffer from a number of drawbacks. One drawback can be that the waste portion of the sheet which has been stripped or blanked can jam or snag in the support frame at different points. This can happen, for example, because the sheet dips or sags into open recesses of a blank or die area, catching edges of material on exposed edges in those areas. When a sheet, a knockout, or other waste material produced from a punched or cut sheet, jams in the conveyance path, the machinery may have to be stopped and an operator may need to remove the cut blanks or waste material. Furthermore, the next sheet in the conveyance path can jam against the blocked waste, possibly ruining the next sheet as well.

To attempt to reduce these and other types of material jam-ups, a thin metal element can be attached to the bridge of the work area frame between the recesses, so that a male blanking part, die, or other working tool can be pressed. This lifting type of support is sometimes called a bridge rule. A bridge rule can be comprised of, for example, a plywood stud or other support beam, which supports a sheet of material as it is conveyed over the bridge. However, attaching, orienting, leveling, and maintaining a bridge rule can be time consuming. Metal bridge rules can be subject to damage caused by bending, metal fatigue, misalignment on the beam, or accidental detachment.

Often a male stripping, blanking, or other member or working tool can apply pressure against a sheet that is only supported at the margins, thus causing the sheet to sag. This can cause the tool to partially or totally fail to strip, punch, blank, or otherwise manipulate the sheet when it strikes an unsupported or sagging area. In the case of blanking operations, the blank can fail to separate from the surrounding skeleton (or waste material) and drop free. Jams and hang-ups in the material supply path and incomplete or faulty stripping and blanking operations can waste valuable operator time and effort, cause lost costs from manufacturing downtime, and result in loss of potentially recoverable material. A need exists to eliminate these and other drawbacks in the art.

SUMMARY OF THE PRESENT INVENTION

According to various embodiments, the present teachings relate to a mechanical device that can be attached or mated to a material conveyance system to lift a transferred sheet of paper or other material, and in one regard elevate the sheet above the edges of blanks, frames, or other edges and/or recesses to prevent, resist, or reduce accidental jamming of the conveyance path. In some embodiments, the deflectable lifting device can comprise an elastically deformable member formed with a generally curved, extended bendable arm, which is formed with a securing base. The securing base can be formed, for example, in a generally rectangular shape for insertion into a matching mounting slot in the frame of a material conveyance system.

According to various embodiments, the base of the deflectable lifting device can be formed with retaining nibs, ribs, teeth, notches, or other protrusions or recesses which create a friction fit or snap-in fit in the mounting slot of the frame.

According to various embodiments, the base can be formed with one or more vertical relief slits, which can permit transverse flex in the material of the base, for example, to create a compression or friction fit in the mounting slot and/or to relieve stress or stresses on the base under load. In some embodiments, the base can be fixedly secured into the slot of, or otherwise affixed to, the frame or other member, using adhesives, magnets, bolts, screws, coupling devices, or other mounting, fastening, or attachment techniques. According to various embodiments, the deflectable lifting device can be mounted or oriented in the direction of the sheet or web path, with the bendable arm positioned parallel to the direction of sheet travel. In some embodiments, when a sheet of paper or other material is conveyed through the work area, it can come into contact with the bendable arm, and the leading edge or distal tip of the bendable arm can deflect downwardly under the applied force of the tools or materials used in stripping or blanking operations, for example, a speed bar, presser bar, or other tool, or, in the case of a female stripper implementation, foam. In some embodiments, the bendable arm can be deflected into an elevated position with respect to the bridge, frame, or other support element. Nevertheless, according to various embodiments, the bendable arm, when deflected, can exert sufficient lift or upward force to elevate the sheet off of the frame, and keep the sheet clear of snagging edges or other projections or hazards as it travels across the stripping, blanking, or other work area. According to various embodiments, multiple deflectable lifting devices can be mounted in the bridge or other frame of the work area, creating a balanced elevation of the sheet or web across an entire span.

BRIEF DESCRIPTION OF THE DRAWINGS

The accompanying drawings, which are incorporated in and constitute a part of this application, illustrate some of the embodiments of the present invention, and together with the description serve to explain the principles of the present invention.

DETAILED DESCRIPTION OF THE PRESENT INVENTION

Figure 1:
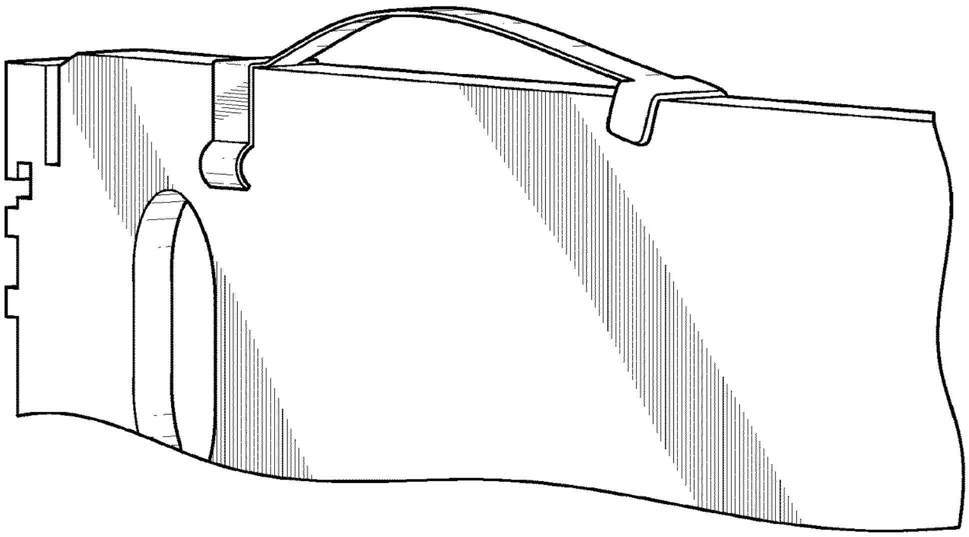
FIG. 1 illustrates a deflectable lifting device according to various embodiments.
Figure 2:
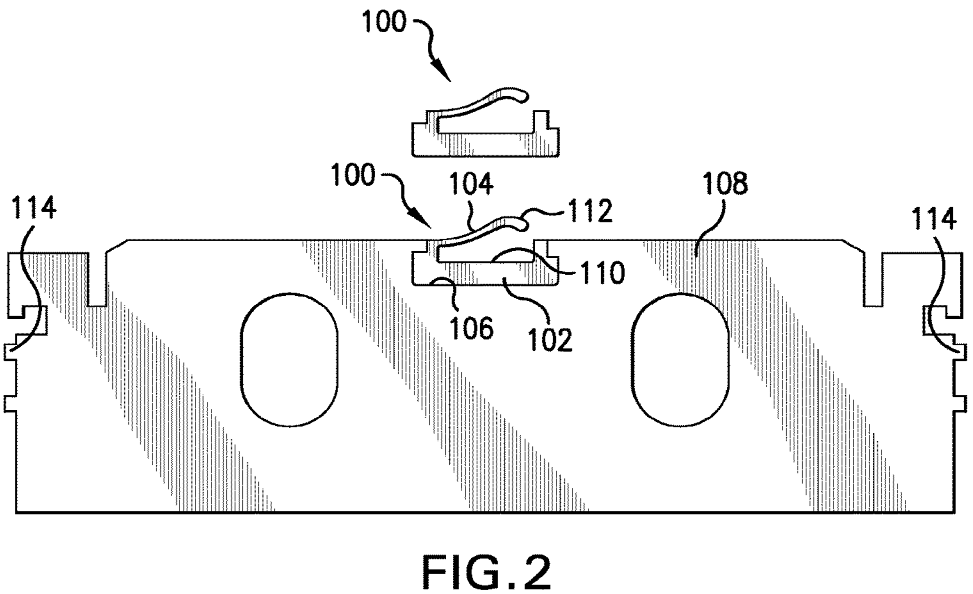
FIG. 2 illustrates a deflectable lifting device mounted in a support, and another removed from the support, according to various embodiments of the present teachings.

According to various embodiments of the present teachings, as illustrated in FIG. 2, a deflectable lifting device 100 can comprise a base 102 and a bendable arm 104. According to various embodiments, the deflectable lifting device 100 can be formed of plastic, metal, wood, or other material. In some embodiments, deflectable lifting device 100 can comprise polyurethane, for example, polyurethane 75 D, or other plastic or resin material. In some embodiments, the deflectable lifting device 100 can have dimensions, for example, such as those illustrated in FIGS. 3, 4, 9(A), and 9(B), or it can have other dimensions or shapes. The deflectable lifting device 100 can be formed in a unitary structure. According to various embodiments, the deflectable lifting device 100 can be made from separate components, parts, or materials, that are joined together, for example, using adhesives or other joining techniques or materials, to form a composite deflectable lifting device.

According to various embodiments and also illustrated in FIG. 2, the deflectable lifting device 100 can be mounted in a mounting slot 106 of a support 108. Support 108 can be, or can include, for example, a plywood or other beam, bridge, spine, truss, joist, joint, or other support member or structure. In some embodiments, the base 102 of deflectable lifting device 100 can have a size, shape, and contour that is generally complementary to the mounting slot 106. In some embodiments, the deflectable lifting device 100 can be mounted in mounting slot 106 using a snap-fit, friction fit, compression fit, or other insertion or fitting technique. According to various embodiments, deflectable lifting device 100 can be inserted into mounting slot 106 from a side position as shown, for example, manually or other insertion or fitting technique. According to various embodiments, deflectable lifting device 100 can be mounted from, or inserted from, the top of mounting slot 106, or it can be mounted from another mounting receptacle.

According to various embodiments and as illustrated in FIG. 2, deflectable lifting device 100 can comprise a recess 110 into which bendable arm 104 can deflect or be depressed. In some embodiments, bendable arm 104 can include an arcuate portion 112, which generally comprises an upwardly extended rounded protuberance or head. Arcuate portion 112 can present a gently curved or rounded contact surface over which the sheet of paper or other material can slide. In some embodiments, the sheet of paper or other material is thereby lifted or elevated from the surface of support 108, for example, by a distance between 1.0 and 10 millimeters, or a distance of greater or lesser elevations. Deflectable lifting device 100 can resist deflection of bendable arm 104 under the weight of the sheet or web, by itself.

According to various embodiments and in orientations as illustrated in FIG. 2, when a sheet of paper or other material is conveyed from left to right (indicated by a direction arrow), the sheet or web can come into contact with deflectable lifting device 100. In some embodiments, during stripping or blanking operations, the leading edge or distal tip of the bendable arm 104 can deflect downward under the applied force of tools or materials used in such operations, for example, a speed bar, presser bar, other tool, or foam, in the case of a female stripper implementation. According to various embodiments, bendable arm 104 elastically deforms or deflects downward with a spring action into recess 110 in response to applied tooling or other forces. Bendable arm 104 can be deflected to an elevated position with respect to the adjacent surface of support 108. According to various embodiments, the sheet or web of paper, or other material, can be driven or pulled through a pathway, which can include a work station, using a motor or other source of power.

According to various embodiments, this clearance or elevation can permit the sheet or web of paper, or other material to be conveyed across support 108 or other work areas, without snagging or jamming on exposed edges, corners, joints, projections, or other potential obstructions or hazards. In some embodiments, directing the sheet or web of paper, or other material in a direction from left to right in the orientation shown can assist in preventing the sheet or web of paper, or other material from potentially snagging under the tip of the bendable arm 104.

According to various embodiments, the elevation of the sheet or web of paper, or other material elevated by deflectable lifting device 100, can also result in fewer scratches, gouges, streaks, tears, or other unintended manufacturing marks or imperfections being impressed on the sheet or web that can arise due to contact with screws, nails, fasteners, splinters, imperfections in frames, work surfaces, or other contact or friction. The contact of the sheet or web against the head of the comparatively small arcuate portion 112 can result in a contact point or patch that is likewise small in area, which creates a bearing effect that reduces drag and facilitates movement of the sheet or web.

According to various embodiments, when no tooling force or other pressure is applied, the spring action of bendable arm 104 can return bendable arm 104 to its normal, unbiased, upwardly extended position. The manufacture of deflectable lifting device 100 from polyurethane 75 D, durable plastic, or other polymeric material, for example, a polyolefin or polytetrafluoroethylene, can result in the expected service life of deflectable lifting device 100 to attain on the order of a million or more mechanical deflections, flexes, bends or other movements or deformations. This durability, in one regard, can reduce the need for maintenance and repair of deflectable lifting device 100, support 108, and the associated work area, work tools, and other components of the processing station or stations, for instance, when compared to a metal bridge rule or other rigid separator part.

According to various embodiments and as illustrated in FIG. 2, support 108 can comprise connecting notches 114, which can permit multiple supports 108 to be connected or coupled, in a daisy-chain fashion. Support 108 can also be connected using connecting notches 114 to other supports or other members. Deflectable lifting device 100, as illustrated therein, resides in a normally biased, upwardly extended position, when no sheet or web of paper, or other material is in contact with bendable arm 104.

Figure 3:
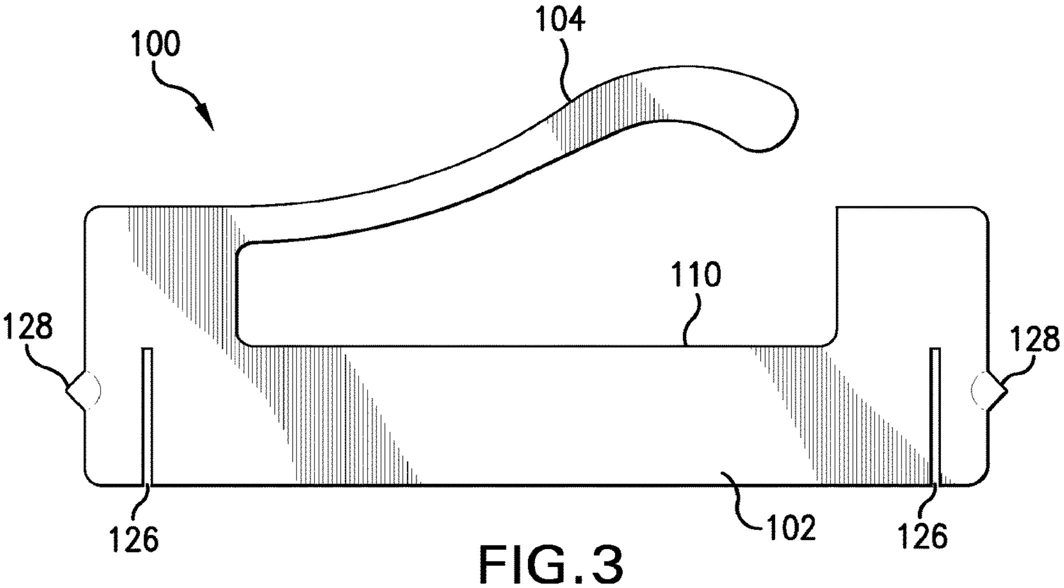
FIG. 3 is a side view of a deflectable lifting device according to various embodiments of the present teachings.

According to various embodiments and as illustrated in FIG. 3, according to the present teachings in another regard, the base 102 of deflectable lifting device 100 can have one or more rib, nib, tooth, or other protrusions 128 which can contact the interior rim of mounting slot 106, which can also create or reinforce a snap-fit, friction fit, compression fit, or other fitting or mounting arrangement. According to various embodiments and as described herein, the base 102 can incorporate slots or channels for the same purposes. Once deflectable lifting device 100 is inserted into the mounting slot 106, deflectable lifting device 100 can remain in a relatively fixed position mounted in slot 106, due to snap-in, friction fit, compression fit, adhesive, or other fitting, mounting, coupling, or attachment devices and/or techniques. In some embodiments, protrusion 128 can be formed as one or more projecting, tooth-like members that extend from an end wall of base 102, which can resist forces tending to pull deflectable lifting device 100 out of slot 106, in an anchoring fashion. Protrusion 128 can reinforce or enhance the security of the fitting in slot 106 or other mounting recess, because a greater force would be required to extract or dislodge deflectable lifting device 100 from the slot 106. In some embodiments and as illustrated in FIG. 3, a protrusion 128 can be formed in each end wall of base 102. According to various embodiments, only one protrusion 128 can be formed, in either or both end walls of base 102, or in other locations.

According to various embodiments and as illustrated in FIG. 3, according to the present teachings in another regard, the base 102 of deflectable lifting device 100 can have formed therein one or more vertical slots 126, which can extend from a bottom surface thereof. One or more vertical slots 126 can create a firm friction fit or compression fit in mounting slot 106, and/or help to relieve flex or tension imposed on deflectable lifting device 100, when under load.

Figure 4:
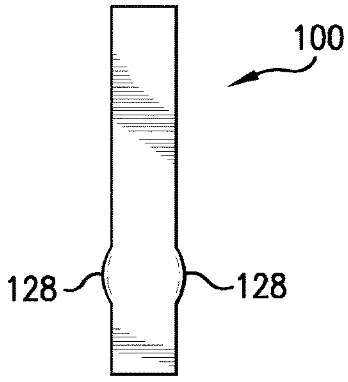
FIG. 4 is a bottom view of a deflectable lifting device according to various embodiments of the present teachings.

According to various embodiments and as illustrated in FIG. 4, protrusion 128 can be, or can include a lateral or sideways bulge, which can have a width comparable to the width of base 102 of deflectable lifting device 100, which will create a more secure fit for the deflectable lifting device 100 in slot 106. Protrusion 128 can be or can include a tooth-like projection, a width-wise bulge, or both configurations.

Figure 5:
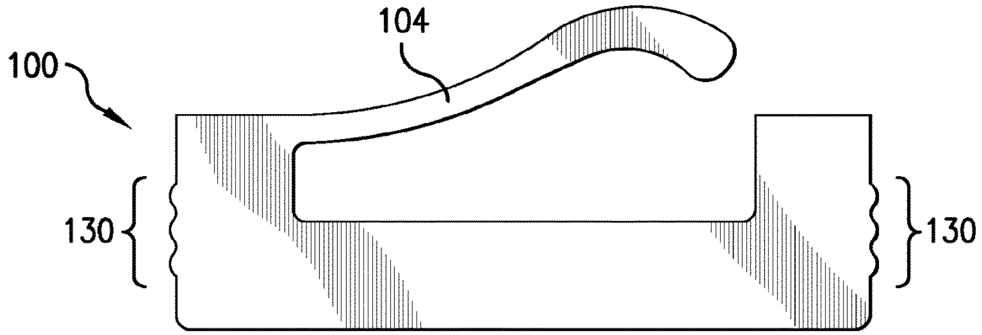
FIG. 5 is a side view of a deflectable lifting device according to various embodiments of the present teachings.

According to various embodiments and as illustrated in FIG. 5, a retaining structure can also be formed as a set of multiple protrusions 130, which can be in a saw-tooth pattern or other configuration. The set of multiple protrusions 130 can likewise be formed in one or both end walls of base 102, or in other locations.

Figure 6:
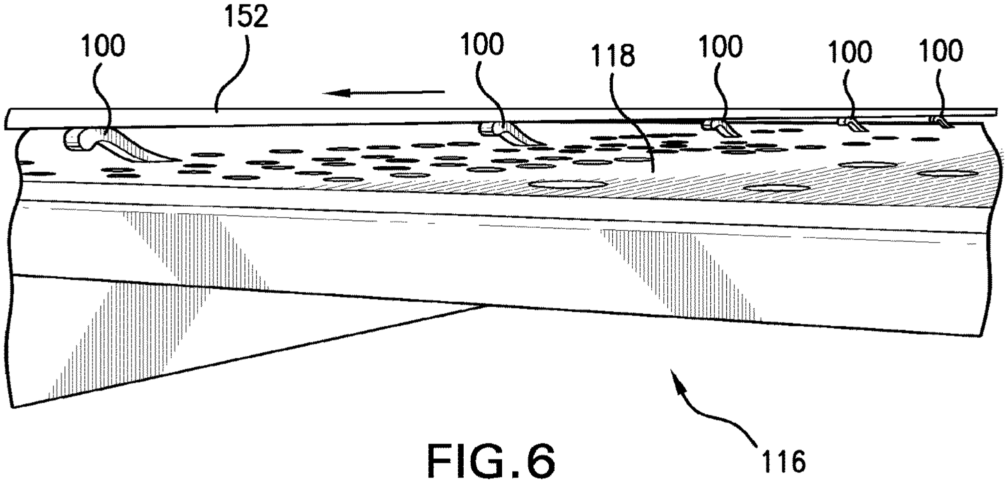
FIG. 6 is a perspective view of a system comprising deflectable lifting devices, used in conjunction with blanking operations according to various embodiments of the present teachings.

FIG. 6 generally illustrates the mounting and placement of one or more of deflectable lifting devices 100 in a stripping station 116 that can be used to carry out stripping operations on a sheet 152, such as a sheet or web of paper, plastic, or other material. As generally shown, stripping station 116 can comprise a stripping surface 118, over which sheet 152 can be passed, illustratively in a right to left direction (indicated by the arrow) as shown, to be punched, cut, compressed, or otherwise contacted to remove or alter selected areas of the sheet 152, leaving the overall expanse of the sheet 152 intact, with desired portions stripped or removed. In some embodiments, a male stripping element, for example, a blade, die, hammer, punch, or other working tool, can descend or otherwise move into contact with the sheet 152 to cut, punch out, or otherwise alter the sheet 152. According to various embodiments, the male stripping element can align with female stripping regions, recesses, or voids, to permit stripped-out material to be removed from sheet 152 and deposited into the recess of the frame of stripping station 116.

According to various embodiments, and as shown in FIG. 6, for example, multiple deflectable lifting device or devices 100 can be mounted into stripping surface 118, to lift the sheet 152 in an even or balanced manner over desired sections of stripping surface 118 or other surfaces. While various embodiments, for example, illustrated in FIG. 6, are shown with the deflectable lifting device 100 members arranged in a regular line, grid, spacing or pattern, it will be understood that any number of deflectable lifting device 100 members can be mounted in stripping surface 118, and in any other desired pattern or arrangement.

Figure 7:
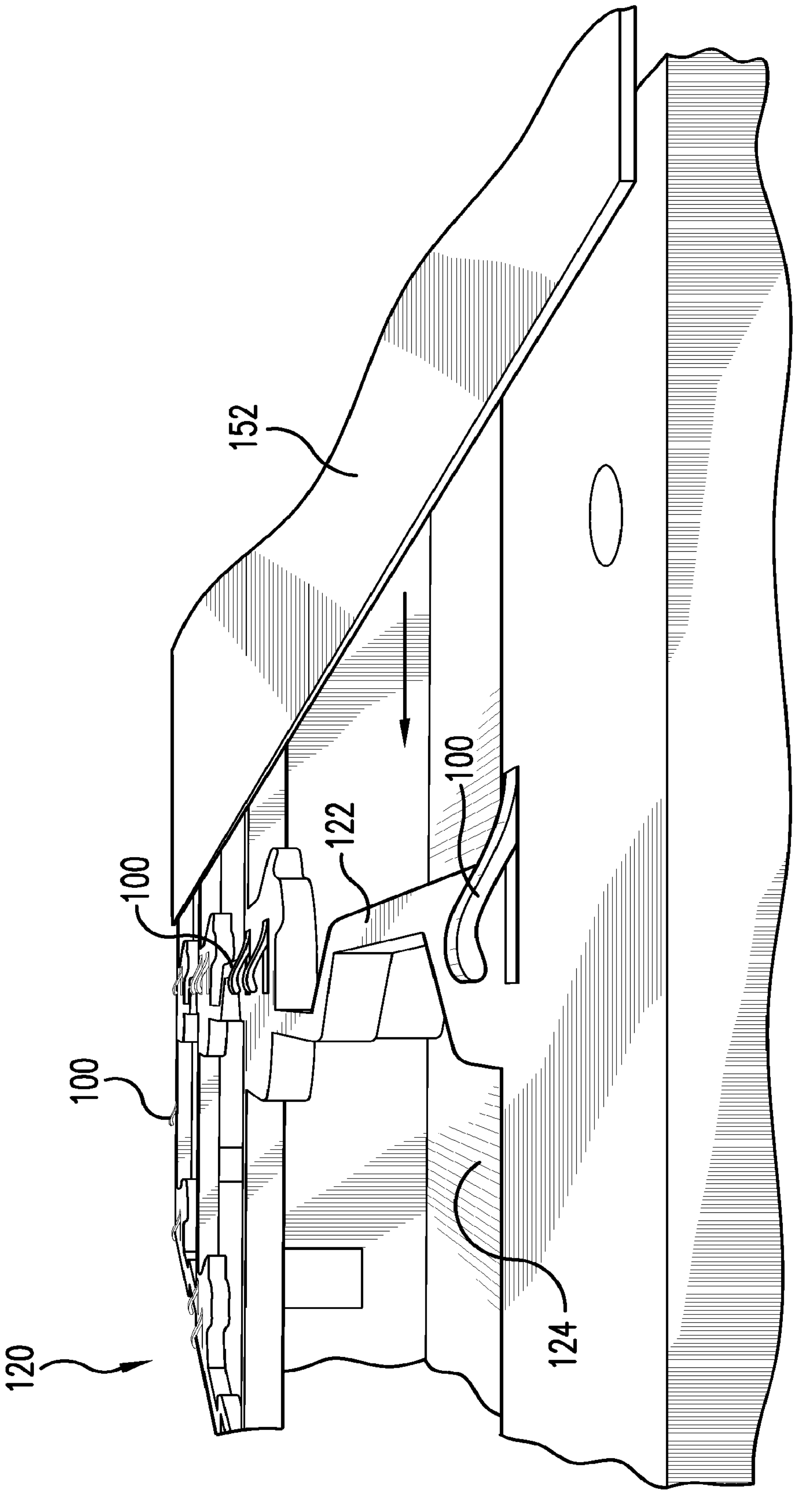
FIG. 7 illustrates a system comprising deflectable lifting devices, used in conjunction with stripping operations according to various embodiments of the present teachings.

FIG. 7 generally illustrates the mounting and placement of one or more of deflectable lifting devices 100 in a blanking station 120 that can be used to carry out a blanking process on a sheet 152, for example, a sheet or web or paper or other material. According to various embodiments, blanking station 120 can generally comprise a set of support bridges 122 and blanking recesses 124 to capture or collect punched-out or cut-out paper or other products or materials punched out or removed from sheet 152. According to various embodiments, sheet 152 can be conveyed illustratively in a right to left direction (indicated by the arrow) as shown, over the comparatively open areas of blanking station 120. According to various embodiments, this can result in a degree of downward bow or sag in the sheet 152 as it is conveyed over those cavities.

According to various embodiments, one or more of deflectable lifting devices 100 can be mounted in one or more support bridges 122 of blanking stations 120, to elevate sheet 152 being conveyed over support bridges 122 and blanking recesses 124, to reduce or eliminate the chance that sheet 152 will snag, jam, tear, or otherwise become obstructed or damaged on the edges of one of the blanking recesses 124, or other projections or obstructions. It can be noted that as illustrated in FIG. 7, the deflectable lifting devices 100 can generally be arranged in a direction parallel to the movement of the sheet 152, with the lead edge or distal tip of bendable arm 104 deflecting downward in the direction of that movement to permit a smooth sliding action over arcuate portion 112. According to various embodiments, such an orientation can prevent the sheet 152 from jamming under the tip of bendable arm 104.

Figure 8A:
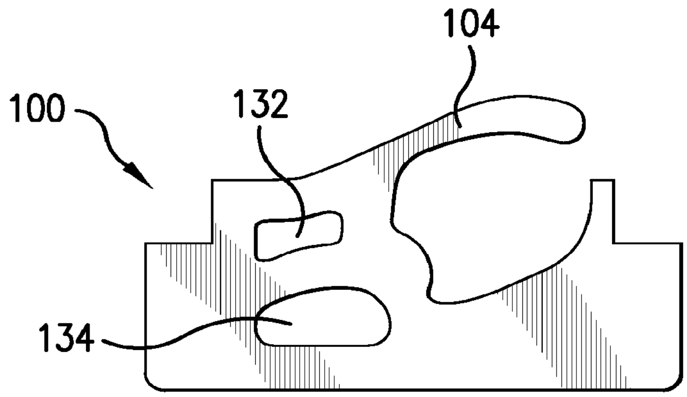
FIGS. 8(A) and 8(B) illustrate deflectable lifting devices according to other various embodiments of the present teachings.
Figure 8B:
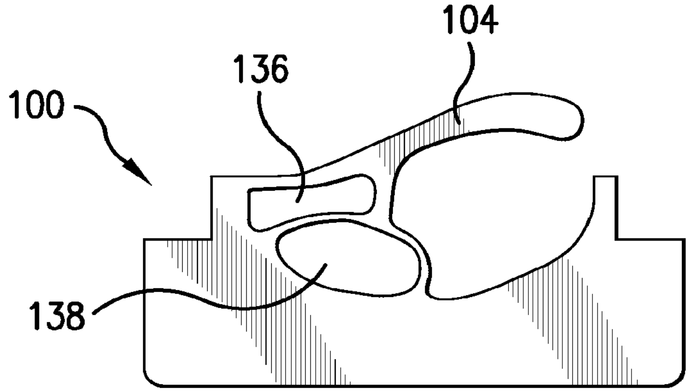

FIGS. 8(A) and 8(B) illustrate a deflectable lifting device 100 according to various embodiments of the present teachings, including embodiments having one or more through-holes in the base. In some embodiments and as shown in FIG. 8(A), deflectable lifting device 100 can incorporate an upper through-hole 132 and lower through-hole 134. In some embodiments and as shown in FIG. 8(A), upper through-hole 132 can comprise a relatively short, rectangular hole, proximate to the fixed end of bendable arm 104. According to various embodiments shown in FIG. 8(A), lower through-hole 132 can comprise a relatively level, oblong hole through an area of base 102.

According to various embodiments shown in FIG. 8(B), deflectable lifting device 100 can incorporate an upper through-hole 136 and lower through-hole 138. According to various embodiments shown in FIG. 8(B), upper through-hole 136 can comprise a relatively elongated, generally rectangular hole, proximate to the fixed end of bendable arm 104. In some embodiments and as shown in FIG. 8(B), lower through-hole 138 can comprise a relatively inclined, oblong hole through an area of base 102.

According to various embodiments, for example, as illustrated in FIGS. 8(A) and 8(B), the incorporation of through-holes can reduce the weight and amount of material used to fashion the deflectable lifting device 100. Incorporation of one or more through-holes proximate to the bendable arm 104, in the base 102, or in other areas can also result in increased flexibility in desired areas because dividing walls between the through-holes can absorb forces and potentially flex, depending on material thickness and/or other factors. The incorporation of through-holes can relieve or reduce repetitive mechanical stresses through various portions of the deflectable lifting device 100. According to various embodiments, one or more numbers of through-holes can be incorporated in the deflectable lifting device 100. In some embodiments, areas of carved-out, fluted, or otherwise removed or altered material can be used instead of, or along with, through-holes and/or other features.

Figure 9A:
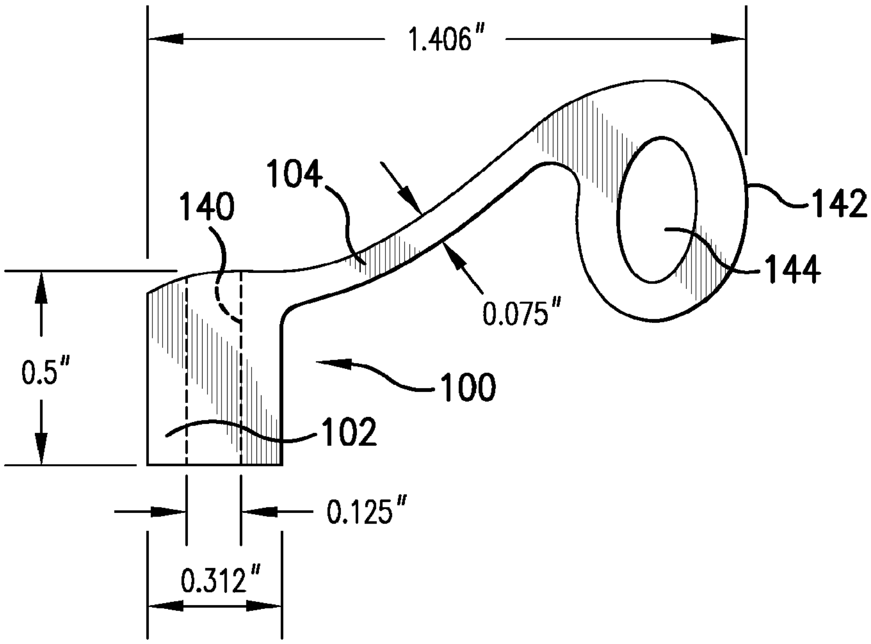
FIGS. 9(A) and 9(B) illustrate a side view and a top view, respectively, of a deflectable lifting device according to various embodiments of the present teachings.

According to various embodiments and as illustrated in FIG. 9(A), deflectable lifting device 100 can incorporate a head 142 at the distal end of bendable arm 104. According to various embodiments, head 142 can comprise a generally oblong or oval structure. According to various embodiments as shown, head 142 can include a head through-hole 144. Head through-hole 144 can comprise a generally oblong, oval, or other shaped hole, formed through head 142. As shown, both head 142 and head through-hole 144 can be configured with a longest, length-wise axis generally aligned in a vertical direction. According to various embodiments, other orientations of head 142 and head through-hole 144 can be used. Bendable arm 104 can be configured to rise at a relatively steeper or greater slope or angle of inclination, terminating at the top of head 142 and at a higher elevation, resulting in a deflectable lifting device 100 that is relatively compact. The incorporation of head through-hole 144 can reduce the weight and the amount of material used to fashion the deflectable lifting device 100. Head 142 can be formed without a head through-hole 144, or with two or more head through-holes.

Figure 9B:
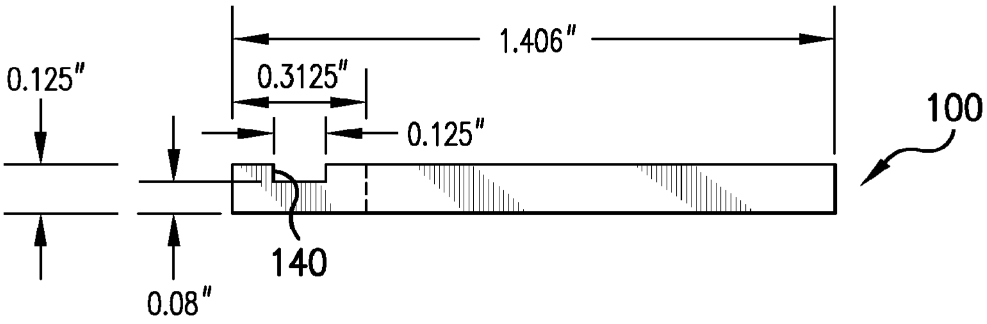

According to various embodiments and as illustrated in FIG. 9(B), deflectable lifting device 100 can incorporate a mounting groove 140, for insertion and registration with, for example, a tooth, tongue, or other projection formed in the frame of a stripping station, blanking station, or other structure or support. As illustrated in FIG. 9(B), the mounting groove 140 can be formed as a rectangular channel in a length-wise vertical direction in base 102. According to various embodiments, other shapes, depths, and orientations of mounting groove 140 can be used.

Figure 10:
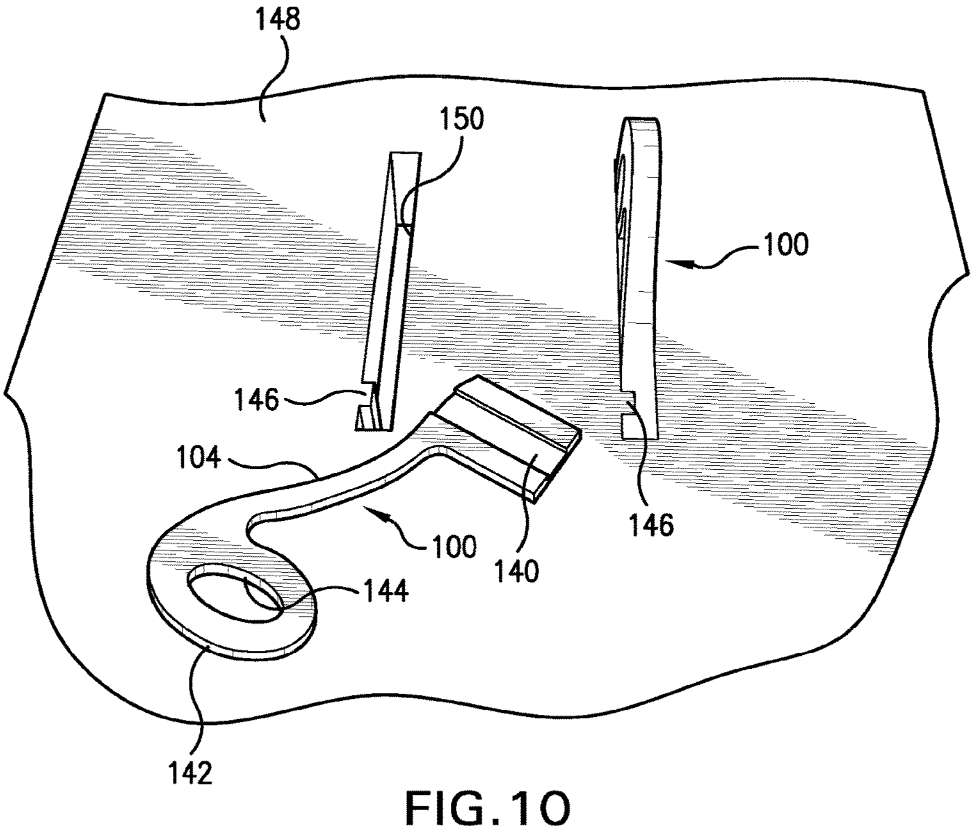
FIG. 10 illustrates deflectable lifting devices according to various embodiments of the present teachings, with one shown in a receiving slot and one shown removed.

According to various embodiments and as illustrated in FIG. 10, deflectable lifting device 100 formed with mounting groove 140 can be mounted into a mounting slot 150 of support 148. According to various embodiments illustrated in FIG. 10, the mounting slot 150 can incorporate a mounting strip 146. In some embodiments as shown, the mounting groove 140 of deflectable lifting device 100 can slidably register or mate with the mounting strip 146 to mount deflectable lifting device 100 to support 148. Mounting groove 140 can extend through the entire thickness of support 148, creating a through-hole. In various embodiments, a depth of base 102 of deflectable lifting device can be configured to match a depth of mounting groove 140, so that the base 102 does not project from an underside of support 148. In some embodiments, mounting groove 140 can be configured so as not to penetrate the entire thickness of support 148. According to various embodiments, the base 102 or other portions of deflectable lifting device 100 can instead be secured to support 148 using adhesives, magnets, hook-and-loop attachments, or other techniques.

According to embodiments and as illustrated in FIG. 10, deflectable lifting device 100 can be mounted in a support 148 in pairs that are located in relatively close proximity. According to various embodiments, deflectable lifting device 100 can be mounted alone in desired areas, or more than two deflectable lifting device 100 can be located in relatively close proximity. While FIG. 10 and other figures generally illustrate that two or more deflectable lifting devices 100 can have the same size and configuration, according to various embodiments, multiple deflectable lifting devices 100 can comprise different sizes, shapes, configurations, orientations, and/or different materials.

Figure 11:
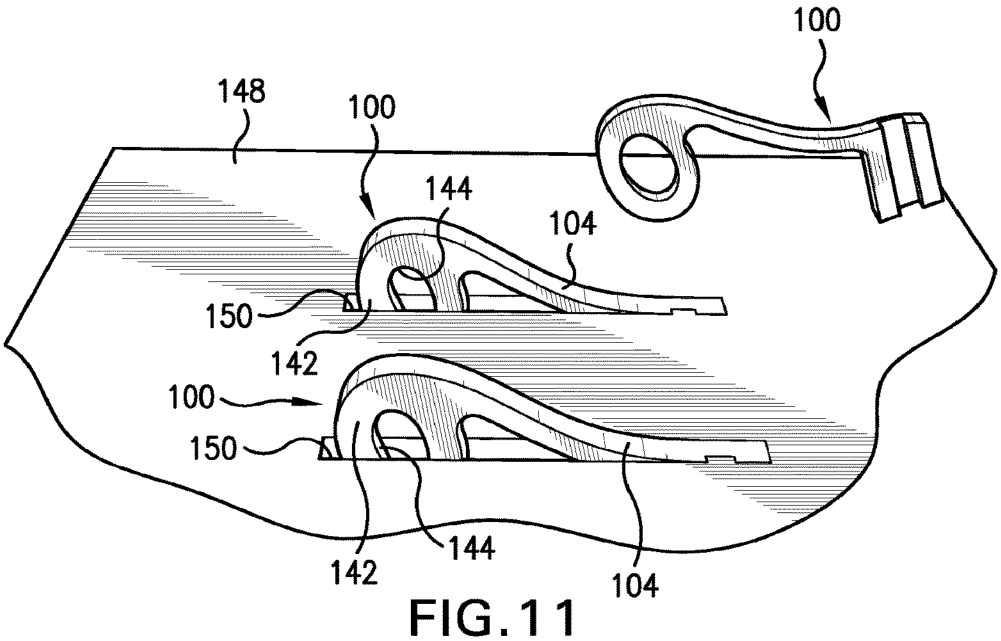
FIG. 11 illustrates a system using deflectable lifting devices according to various embodiments of the present teachings.

According to various embodiments and as illustrated in FIG. 11, deflectable lifting device 100 can be mounted in support 148. As illustrated in FIG. 11, the bendable arm 104 of deflectable lifting device 100 can reside in an unbiased position as shown such that a lower end of head 142 lies beneath the surface of support 148, and can be partially recessed in mounting slot 150. Therefore, according to various embodiments as shown, the sheet or web of paper or other material traveling over deflectable lifting device 100 can be presented with no recess, crevice, or catch upon which to snag or jam itself in the device. According to various embodiments, it can also be made difficult or impossible for the sheet or web of paper or other material to snag or jam on deflectable lifting device 100, whether that sheet or web of paper or other material is conveyed in a direction parallel to the deflectable lifting device 100, or otherwise. While two deflectable lifting devices 100 are shown as mounted or installed in FIG. 11, according to various embodiments, a single deflectable lifting device 100, or more than two deflectable lifting devices 100, can be mounted in one or more areas. (A third, un-mounted deflectable lifting device 100 is shown in FIG. 11, merely for illustration).

Figure 12:
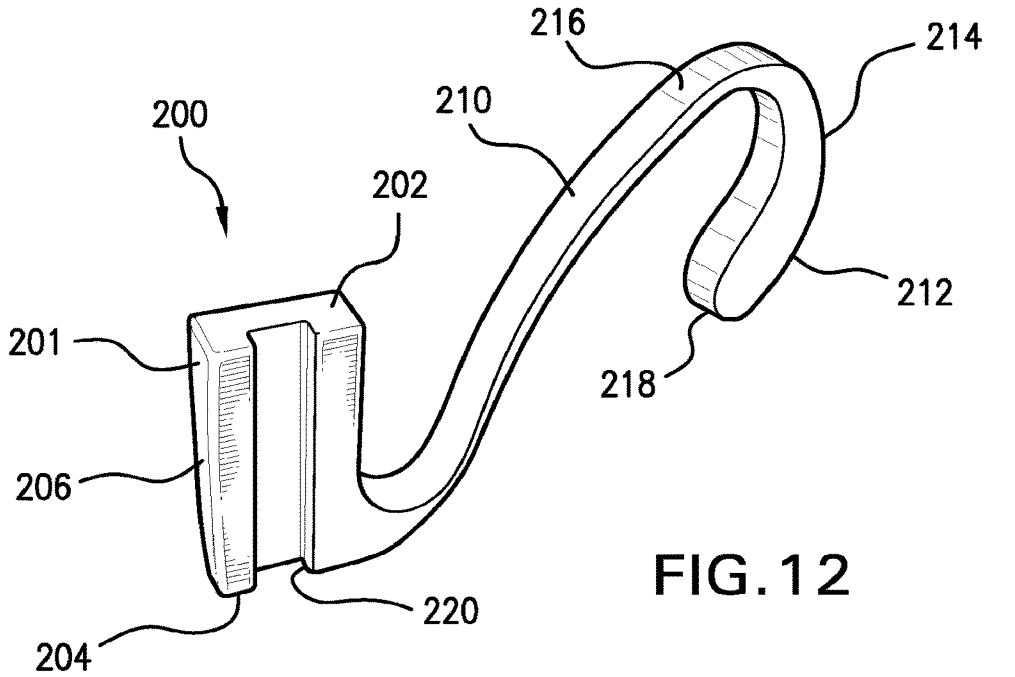
FIG. 12 illustrates a side view of a deflectable lifting device according to various embodiments of the present teachings.

According to various embodiments and as illustrated in FIG. 12, deflectable lifting device 200 can comprise base portion 201, which can have top surface 202, bottom surface 204, leading edge 206, and trailing edge 208. In some embodiments, deflectable lifting device 200 can further comprise bendable arm 210. In some embodiments and as illustrated in FIG. 12, bendable arm 210 can comprise bendable arm trailing edge 214 and trailing edge curved surface 212, which can curve towards the trailing edge 208 of base portion 201. According to various embodiments, bendable arm 210 can comprise bendable arm top surface 216, which can rise above the plane defined by top surface 202 of base portion 201. Bendable arm 210 can comprise bendable arm bottom surface 218, which can extend below the plane defined by top surface 202 of base portion 201.

According to various embodiments, also illustrated in FIG. 12, base portion 201 can comprise a notch 220, which can be formed therein to assist in securing lifting device 200 in a corresponding slot of a retaining board.

According to various embodiments and as shown in FIG. 12, the bendable arm can be connected to a bottom portion or end of the base portion, as opposed to being connected to the top portion of the base portion as shown in FIGS. 9(A) to 11. In some embodiments, because of this, mechanical loads and flex points of bendable arm 201 can be redistributed, compared to other points of attachment.

In some embodiments, the lifting device can comprise a molded article which can comprise an acetal resin, for example, an acetal polyoxymethylene resin such as DELRIN®, available from E.I. DuPont de Nemours and Company, Wilmington, Del., or other resin or material can be used.

Figure 13:
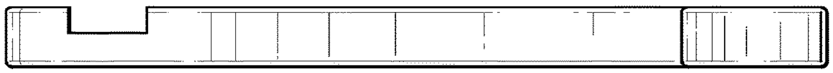
FIG. 13 illustrates a bottom view of a deflectable lifting device according to various embodiments of the present teachings.
Figure 14:
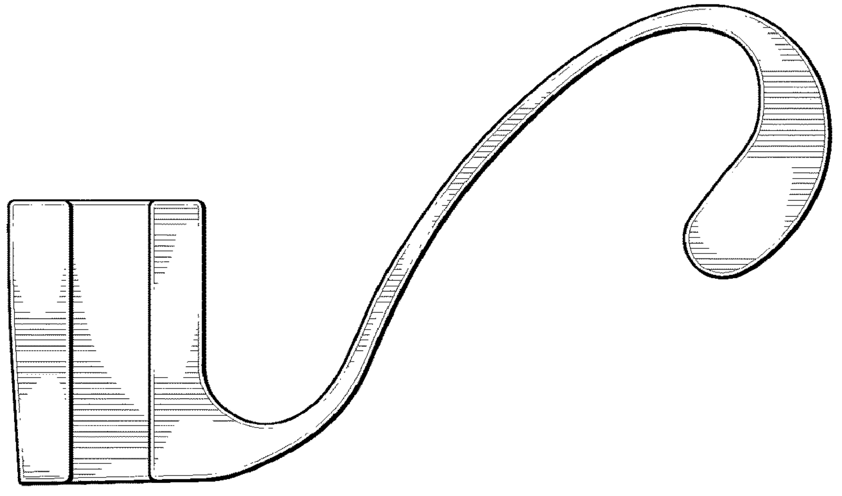
FIG. 14 illustrates a side view of a deflectable lifting device according to various embodiments of the present teachings.
Figure 15:
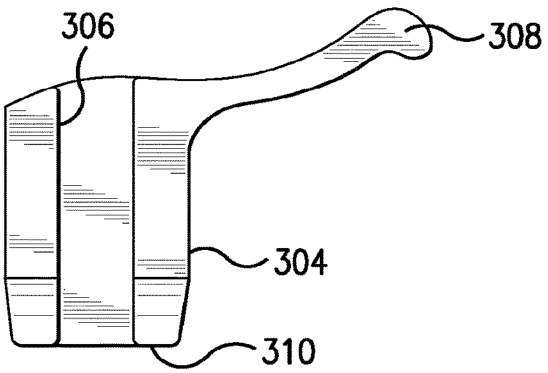
FIG. 15 appears to be a side view of a deflectable lifting device according to various embodiments of the present teachings.
Figure 16:
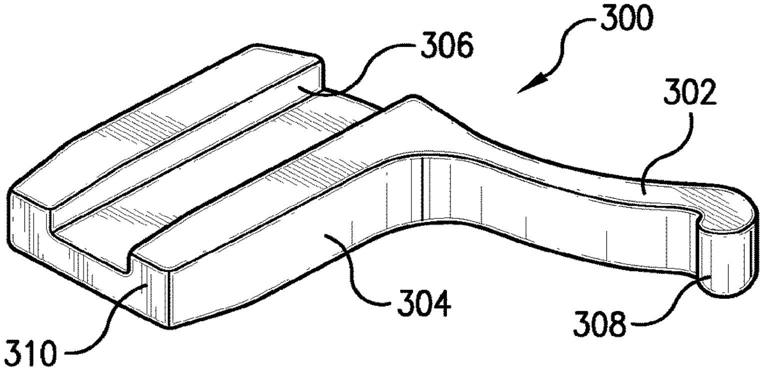
FIG. 16 illustrates an enlarged perspective view of the lifting device shown in FIG. 15.
Figure 17:
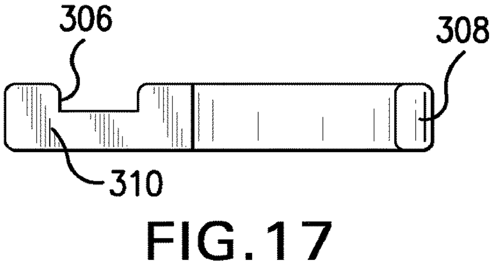
FIG. 17 illustrates a bottom view of the deflectable lifting device shown in FIG. 15.

FIGS. 13 and 14 illustrate a bottom and side view, respectively, of a deflectable lifting device 200 with illustrative dimensions shown. It will be appreciated other dimensions or sizes of deflectable lifting device 200 can be used.

Figure 18:
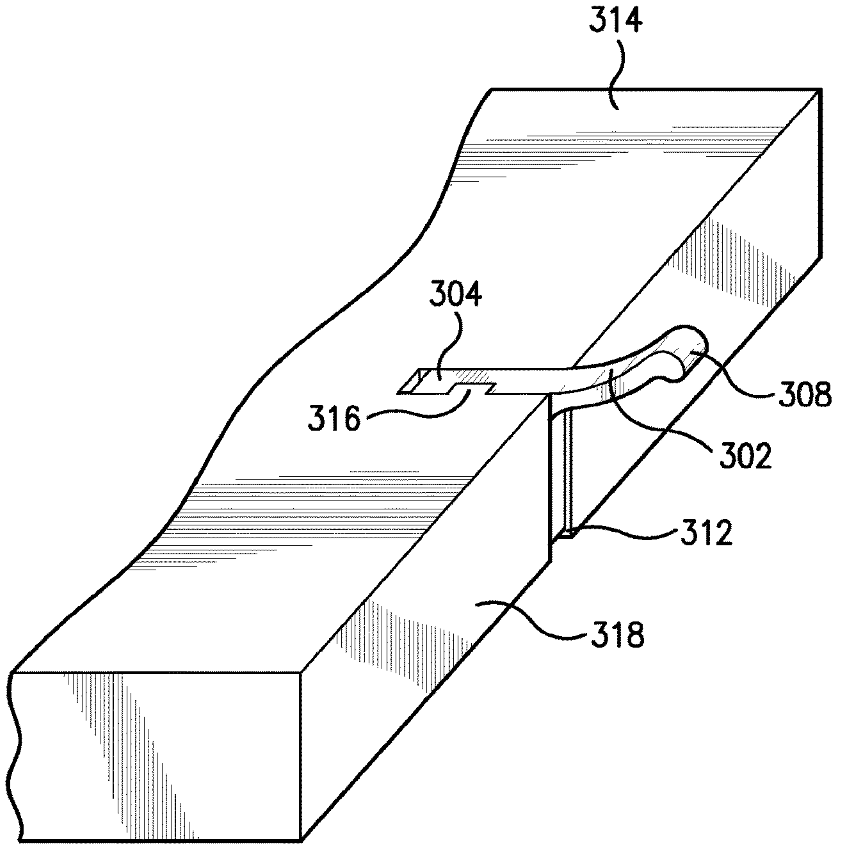
FIG. 18 is a perspective view of a system comprising a blanking station and the lifting device shown in FIG. 15 retained in a retaining board.

Another embodiment of the present teachings is shown in FIGS. 15-18. A lifting device 300 is shown in a deflectable arm 302 and a body 304. Arm 302 comprises a distal head 308 and is connected to body 304. Body 304 comprises a bottom 310 and a slot 306 formed therein. Slot 306 is designed to accommodate a protruberance 316 provided in a retaining slot 312 of a retaining board 314, for example, a retaining board as shown in FIG. 18, that comprises an inner peripheral face 318 of a blanking station. In some embodiments, device 300 can temporarily support a workpiece in a blanking station just prior to the workpiece being blanked. As is shown, arm 302 and head 308 can extend into a blanking recess of a blanking press and can be deflectable by the blanking press during a blanking operation. Such a blanking recess can comprise inner peripheral 318 as shown in FIG. 18.

The entire contents of all references cited in this disclosure are incorporated herein in their entireties, by reference. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. A material conveying system comprising:

a frame having a top surface;

a mounting slot formed in the frame and including an opening at the top surface of the frame; and a deflectable lifting device comprising a securing base and a bendable arm extending from the securing base, the securing base having a size, shape, and contour that is generally complementary to the mounting slot, the securing base being disposed in the mounting slot, wherein the bendable arm extends from the securing base, away from the mounting slot, and above the top surface of the frame, the bendable arm configured to exert sufficient lift to elevate a sheet of material off of the top surface of the frame.

2. The material conveying system of claim 1, wherein the bendable arm portion has a first portion that is curved in a first direction of curvature and a second portion that is curved in a second, opposite direction of curvature.

3. The material conveying system of claim 1, wherein the head comprises a hollow center.

4. The material conveying system of claim 1, wherein the frame comprises plywood.

5. The material conveying system of claim 1, wherein the frame comprises a plurality of other mounting slots formed therein, in addition to the mounting slot, and a plurality of deflectable lifting devices disposed in the plurality of other mounting slots.

6. The material conveying system of claim 1, wherein the mounting slot comprises an elongated opening at the top surface of the frame, the elongated opening has a length and a width, the securing base of the deflectable lifting device has a length that is no longer than the length of the elongated opening, the securing base has a width that is no wider than the width of the elongated opening, and the securing base is configured to fit through the opening at the top surface of the frame so that the securing base can be mounted in the mounting slot by insertion through the top surface.

7. The material conveying system of claim 1, further comprising a sheet conveyor configured to convey a sheet of material across the top surface of the frame in a direction of sheet travel, and the bendable arm extends away from the top surface in a manner such that the sheet of material first contacts the bendable arm at a location where the bendable arm is flush with the top surface and subsequently the sheet of material is lifted up above the top surface as the sheet of material travels in the direction of sheet travel.

8. The material conveying system of claim 7, wherein the frame is configured to remain stationary as the sheet of material is conveyed across the top surface.

9. The material conveying system of claim 1, further comprising a sheet conveyor configured to convey a sheet of material across the top surface of the frame in a direction of sheet travel, wherein the frame is configured to remain stationary as paper is conveyed across the top surface.

10. The material conveying system of claim 9, wherein the deflectable lifting device is fixed in the mounting slot and refrained from movement in the direction of sheet travel as a sheet of material is conveyed across the top surface.

11. The material conveying system of claim 1, wherein the deflectable lifting device and the mounting slot are configured such that the mounting slot receives a portion of the bendable arm when the bendable arm is deflected toward the top surface of the frame.

* * * * *